United States Patent Office
3,445,344
Patented May 20, 1969

3,445,344
APPARATUS FOR PURIFYING WATER
Evans T. Morton, Milwaukee, Wis., assignor to Aqua-Chem, Inc., a corporation of Wisconsin
Filed Sept. 27, 1965, Ser. No. 490,601
Int. Cl. C02b 1/08; B01d 3/08
U.S. Cl. 202—176                    13 Claims

ABSTRACT OF THE DISCLOSURE

A water purifying device for home or like use and which can be mounted in an upright cabinet. The device usually includes a heat pump or refrigeration cycle system for heating and evaporating impure water in an evaporating zone and for condensing distillate in a condensing zone. Below these two zones, product hot and cold water holding tanks are provided with the former mounted below the latter and an open conduit connecting the two to apply the cold water head to the hot water and for receiving condensate from the condensing zone. The feed water line to the evaporating zone retains a body of solid polyphosphate in direct contact with impure feed water for supplying polyphosphate to the feed water and a valve in the feed line opens responsive to the temperature of a supply of impure water in the evaporating zone still below the polyphosphate thermal decomposition temperature. Water can be delivered from this supply for vaporization by a rotating inverted open cone with an external circular intermediate ridge as a pump having its small open end in contact with the water so that water flows to the top of the cone inside the cone and to the intermediate ridge outside the cone for delivery radially to heating surfaces in the evaporating zone.

---

This invention relates to apparatus for handling and removing impurities from liquids and more particularly to improvements in apparatus for handling and purifying water.

It is the general object of the present invention to provide an improved system for handling and purifying liquids such as water.

It is a more specific object of the present invention to provide a new and improved apparatus for purifying water, including removal of salts therefrom, to render brackish, hard, or other disagreeable water suitable for drinking.

It is also an object of this invention to provide a new and useful pumping system for raising water from a body of water to an elevated level.

Another more specific object is to provide a new and improved apparatus for purifying water which includes a pumping system for raising the water to a plurality of spaced levels in a vaporizing zone where the water is sprayed from the pumping system and is vaporized.

Still another object of this invention is to provide a new and useful water purification device including an evaporator-condenser tank, a cold pure water storage tank, and a hot pure water storage tank mounted at different levels on an upright frame structure, in which device impure water is purified in the evaporator-condenser tank and is delivered to the cold and hot water storage tanks while the cold and hot water storage tanks are maintained in flow communication with each other, and in which device a level control is provided in one of the storage tanks in such manner as to initiate operation of a water purification system in the evaporator-condenser tank when water is needed by either of the storage tanks, and to discontinue operation of the purification system when the need has been fulfilled.

Yet another object of this invention is to provide a water purification device in accordance with any of the foregoing objects with a system for preventing corrosion of metals and especially ferrous metals.

Another object is to provide apparatus in accordance with any of the foregoing objects in which a heat pump is used for heating and evaporating water and for cooling and condensing vapors in separate evaporator and condenser zones respectively, and in which water vapor is moved from the evaporator zone to the condenser zone by a current of air.

A further object of this invention is to provide a new and useful household unit according to any of the foregoing objects for providing pure hot and cold water products from an impure water feed, and having hot and cold water spigots to which hot and cold water are supplied by a head of water in hot and cold water storage tanks.

Other objects will be apparent from the following descriptions and the drawings, in which:

FIG. 4 is a schematic diagram of the operative components of the device of FIG. 1 showing the relative association of such components and the flow between the components; and FIG. 5 is a wiring diagram of the device of FIGS. 1–4.

Figure 1:
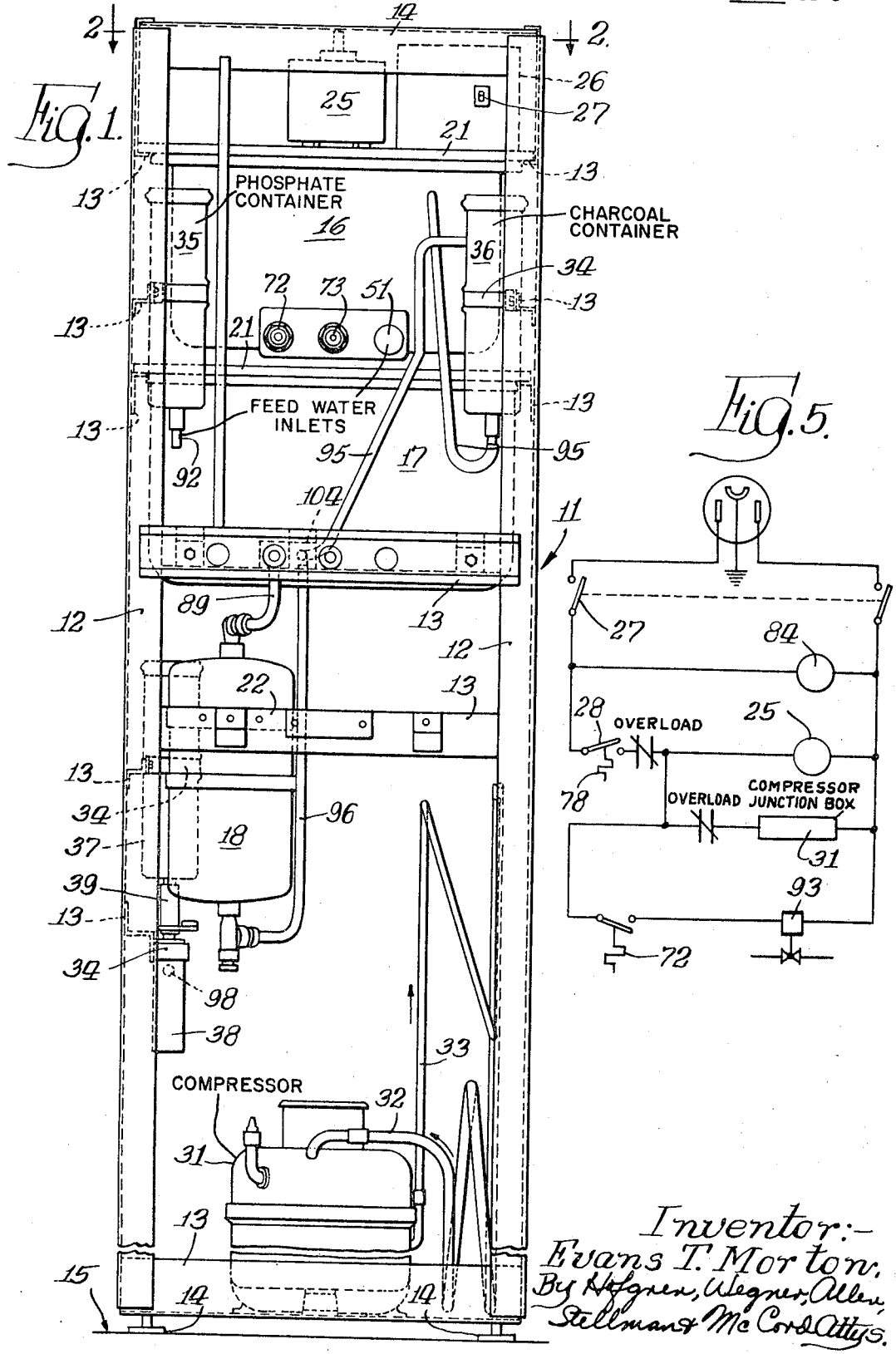
FIG. 1 is a view from the front of an embodiment of a household purification device designed for providing at least five gallons of pure water per day and shown with a front casing wall removed.

While this invention is susceptible of embodiment in many different forms, there is shown in the drawings and will herein be described in detail one specific embodiment with the understanding that the present disclosure is to be considered as an exemplification of the principles of the invention and is not intended to limit the invention to the embodiment illustrated.

Figure 2:
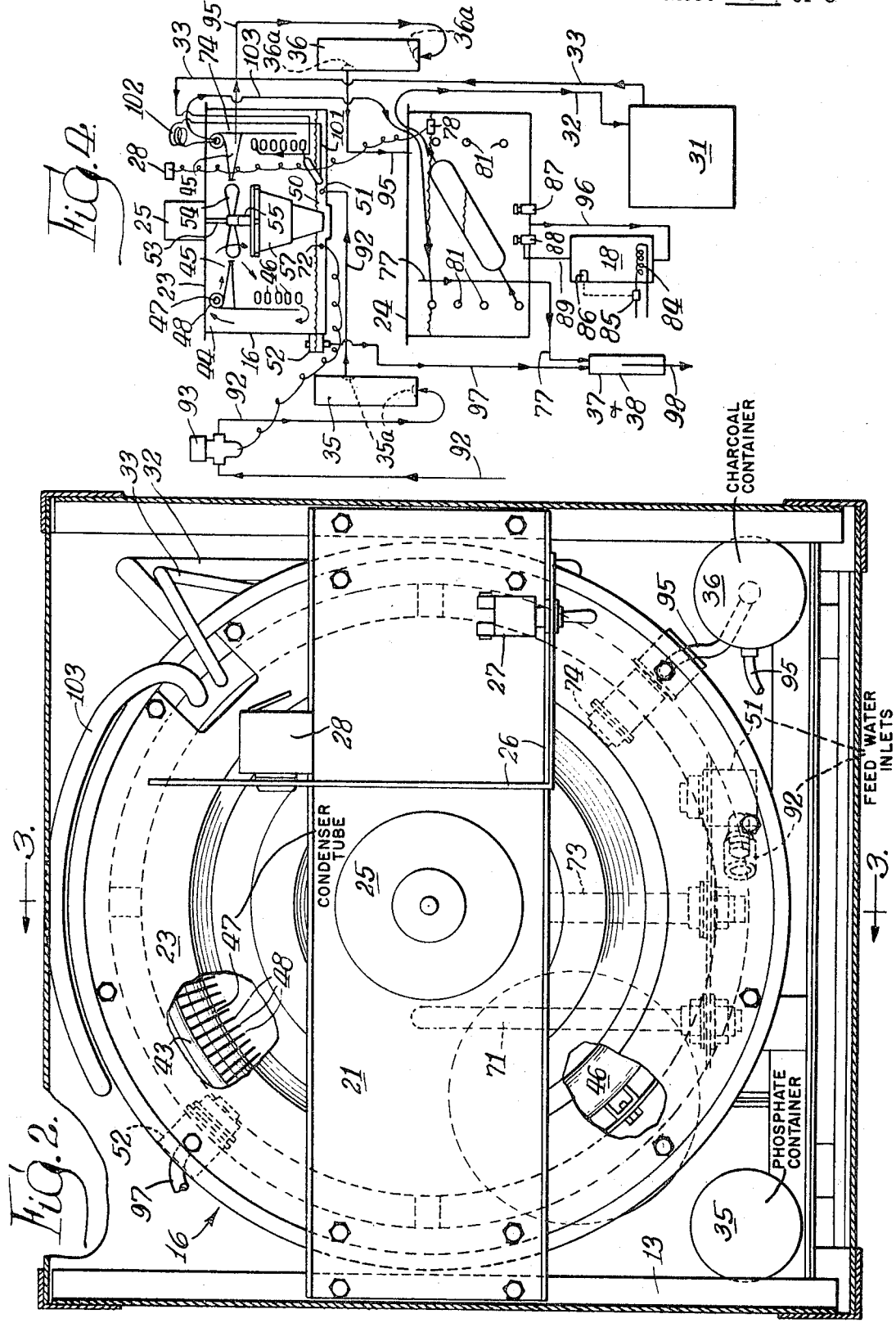
FIG. 2 is an enlarged section along line 2—2 of FIG. 1.
Figure 3:
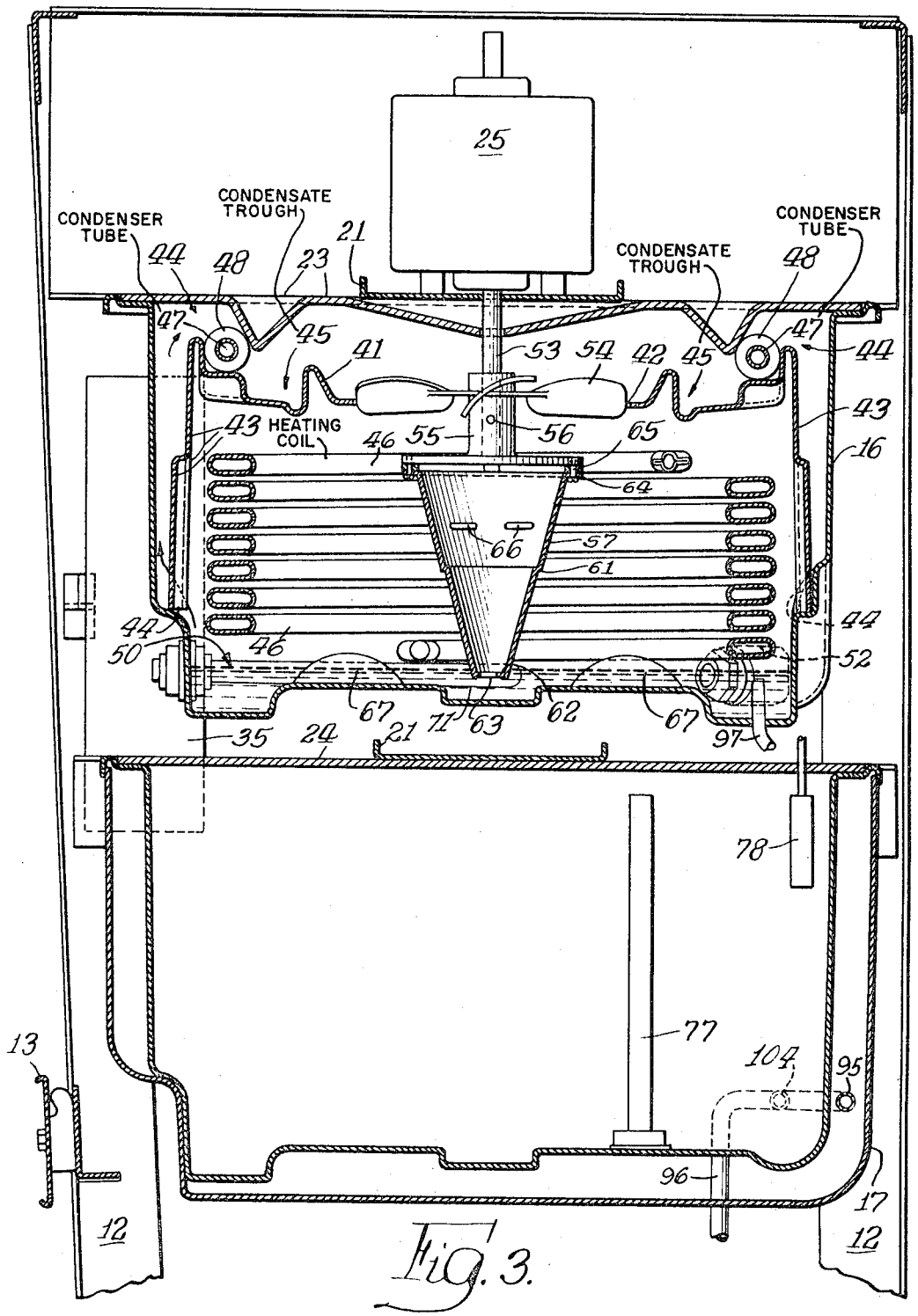
FIG. 3 is a section along line 3—3 of FIG. 2.

Reference is first made to FIGURES 1 through 3 where the general layout of a form of water purification device of the present invention is illustrated. The illustrated device includes an upright frame 11 comprised of upright corner angle member 12 and cross braces 13 secured between the angle members. A leveling leg 14 is provided on each corner at the bottom of frame 11 for supporting and leveling frame 11 from a suitable support surface such as floor 15.

A purification tank 16 and a cold water storage tank 17 are mounted by support channels 21, which bridge between opposing cross braces 13, to the frame 11, and a hot water storage tank 18 is mounted by a suitable bracket and clamp 22 to another cross brace 13. The purification tank 16 is adjacent the top of frame 11 and includes a system for purifying water basically much like the system described by E. T. Morton in application Ser. No. 239,396, entitled, Method and Apparatus for Purifying Liquids, filed Nov. 16, 1962, now abandoned. Cold water storage tank 17, and hot water storage tank 18, mounted at respectively lower levels, are provided for storing product hot and cold water which is produced by the purification system. Tanks 16 and 17 are plastic and tank 18 is copper, although other materials can be substituted as desired. The cold water storage tank 17 is of double wall construction providing an insulating air space between the two walls.

Covers 23 and 24 are secured to the tops of tanks 16 and 17, respectively, and are also secured to support channels 21 for supporting the tanks. A motor 25 and a switch mounting plate 26, having switches 27 and 28 mounted thereon, are supported by the support channel 21 which also supports the cover 23 and purification tank 16.

The purification system in purification tank 16 is of the type including an evaporation zone and a condensing zone which are provided with heating and cooling surfaces, respectively. The illustrated system includes a refrigeration circuit which operates on a heat pump principle whereby heat is extracted from the cooling surfaces and applied to the heating surfaces. A compressor 31 is mounted at the bottom of frame 11 as a portion of the refrigeration circuit, including an insulated suction line 32 and a compression line 33 containing refrigeration fluid. The operation of the refrigeration cicuit will be more fully described below.

Switch 27 is a manually operable main "on-off" toggle switch and switch 28 is an "on-off" switch which is controlled by a determined existence of a need for additional purified water in the storage tanks 17 and 18. Turning switch 27 on enables switch 28 to energize the entire electrical circuitry. When switch 28 is closed, motor 25 and compressor 31 are started and the purification system is prepared for receiving impure water feed. Opening switch 28 stops the motor and compressor and stops flow of feed to the purification system.

Also secured by suitable clamps or brackets 34 to frame 11 are: a polyphosphate container 35 having an inlet and outlet with screens 35a accross the inlet and outlet for retaining solid polyphosphate material in the container, charcoal container 36 having similar screens 36a for retaining charcoal, and an overflow and air break trap 37 which is connected by a suitable hose 39 to a trap adaptor 38. In a preferred form of the device, the polyphosphate container 35 contains a supply of limited solubility polyphosphate, termed "glassy" polyphosphate in the art, which solubilizes to at least about .5 to 1 part per million in impure water to be purified by the system. The glassy polyphosphate is believed to be a form of water soluble polyphosphates, e.g. sodium and postassium polyphosphates, which has been fused and cooled to provide a product having the appearance of glass and having decreased water solubility.

Referring now more particularly to FIGURES 2 and 3, the purification system in purification tank 16 includes an evaporating or heating zone and a condensing or cooling zone. A partition 41 for separating the two zones is supported from the walls of tank 16 interiorly thereof and includes a central opening 42, a peripheral skirt portion 43 and a circular trough 45 stamped as a circular depression in the upper face of a generally transverse portion of partition 41 between skirt portion 43 and central opening 42. The evaporating zone is generally within the innermost chamber formed between partition 41 and the bottom wall of tank 16. The condensing zone is generally above partition 41. Trough 45 is a water collection trough for collecting condensed purified water in the condensing zone, as will be seen.

A heat exchange heating coil 46, connected to the compression side of compressor 31 via line 33, is suspended by its inlet and outlet ends within the evaporating zone in tank 16 and adjacent the skirt portion 43. A circular heat exchange cooling tube 47, connected to the suction side of compressor 31 via line 32 and having a plurality of spaced external fins 48, is supported on the above partition 41 in the cooling zone.

An impure water inlet 51 (FIGURES 1 and 4) is provided as a port for introducing feed water to be purified into tank 16 to provide a body of water 50 within the tank. The level of the body of water 50 is determined by an overflow standpipe system 52.

A shaft 53, driven by motor 25, extends downwardly through channel member 21 and cover 23 and extends into tank 16. An air impeller or fan blade 54 is secured to a hub 55 which is pinned at 56 to shaft 53 for rotation therewith. Fan blade 54 is disposed for driving air downward, as viewed in FIGURE 3, upon rotation of shaft 53 by motor 25.

Also secured to hub 55 is a pumping element in the form of a spinner 57. In general, the spinner 57 provides a plurality of separate surfaces for delivering water from the body of water 50 as a spray into contact with the heating coil 46. Preferably, the spinner 57 delivers the water at a plurality of vertically spaced levels. Spinner 57, in the illustrated form, is a vertically disposed generally conical hollow member which has a conical wall having generally parallel inner and outer surfaces. The generally conical configuration of spinner 57 can be considered as comprised of first and second integral conical sections. Each conical section of the configuration has its minimum diameter at the lower end and its maximum diameter at the upper end. The minimum diameter end of the upper section is joined to the maximum diameter end of the lower section and the maximum diameter of the lower section is smaller than the minimum diameter of the upper section so that outwardly projecting ridge 61 is formed at the integral junction between the two sections.

At the lower end of spinner 57, an inwardly projecting circular flange 62 defines a central pump intake port 63 and the vertical disposition of the spinner is such as will submerge intake port 63 beneath the water surface when the body of water 50 is present in the bottom of tank 16. Spinner 57 is mounted at its upper end by an outwardly projecting flange 64 to an enlarged outwardly projecting flange portion of hub 55, which is sufficiently extensive to define a cover over the top of spinner 57. Flange 64 of spinner 57 is secured to the flange of hub 55 by suitable bolts and spacers, maintaining flange 64 spaced from hub 55. Optionally, and as illustrated in the device shown in the drawings, a plurality of ports or slots 66 can be provided through the wall of spinner 57, e.g. at a level intermediate ridge 61 and flange 64.

When spinner 57 is driven rotationally on its axis by motor 25 with port 63 submerged, water is drawn from body 50 up the inner and outer surfaces of spinner 57. As water on the outer surfaces reaches ridge 61, it is diverted outwardly and sprayed or thrown centrifugally from the outer surface of spinner 57 onto tubes 46. The water traveling up the inner surface of spinner 57 travels to the top and is thrown centrifugally over the lip defined by flange 64 and through the space between flange 64 and hub 55, and is sprayed on tubes 46 at a higher level. Where the ports 66 are provided at an intermediate level, some of the water traveling up the inner surface of spinner 57, when it reaches port 66 is thrown from the spinner outwardly onto coil 46 at such intermediate level. At each level heating coil 46 serves to supply heat for evaporating the water.

During operation of spinner 57, the rotation of the spinner in contact with the body of water 50 tends to swirl the body of water and for this reason a plurality of baffle or dam members 67 are provided, secured to and upstanding from the bottom of tank 16 within the body of water 50. The baffles or dams 67 are disposed transverse to the direction of swirling, preferably generally along radii from the axis of spinner 57.

As best seen in FIGURES 1 and 2, purification tank 16 is also provided with a well 71 which receives a temperature sensor 72 (FIGURES 1 and 4) extending into the body of water 50, the function of which will be described below. An anode is also removably mounted through the wall of tank 16 and extends into the body of water 50. Anode 73 is composed of zinc or other metal higher in the electromotive series than the metal of tank 16 and which does not react violently with water. Anode 73 functions to impede galvanic corrosion of heating coil 46 in tank 16. Also in tank 16, an outlet port 74 is provided as an outlet from the product collection trough 45 and includes a suitable fitting through which product water can be withdrawn.

In operation of the evaporation system and with special reference to FIGURE 3, the water from body 50 is drawn up by spinner 57, thrown onto the heating coil 46, and evaporated. The resulting water vapor is picked up by a cyclic current of air driven downward through coil 47 by fan 54. The downward moving stream of vapor laden air passes in contact with the surface of the body of water 50 and is diverted upward and outward through passages 44 and passes into contact with cooling tube 47 where water is condensed from the air as the air returns for further cycling by fan 54 to pick up still more water vapor to be carried to the cooling tube 47. Water condensed by cooling tube 47 falls therefrom and is collected in trough 45.

Cold water storage tank 17, mounted below water purification tank 16 receives condensed water from trough 45 and has a safety overflow standpipe 77 for carrying surplus production of water to drain. Tank 17 also includes a water level and temperature sensor 78. Sensor 78 closes switch 28 responsive to a predetermined maximum desired water temperature or a predetermined minimum desired water level in tank 17 and opens switch 28 responsive to a lower predetermined desired cold water temperature or a predetermined maximum desired water level in tank 17. The water level and temperature control sensor system and its operation are more fully described by Evans T. Morton in copending application Ser. No. 391,977 filed Aug. 25, 1964, and entitled, Liquid Level and Temperature Control now U.S. Patent 3,214,933.

As seen in FIGURE 4, cold water storage tank 17 also includes a heat exchange tube 81 for cooling the water in the storage tank.

Hot water storage tank 18 (FIGURES 1 and 4) also receives condensed water and is provided with an electric heating element 84 for heating water therein. Heating element 84 is controlled by a switch 85 which is in turn controlled by a temperature sensor 86 for actuating electric heater 84 responsive to a temperature fall below a desired minimum and for deactivating electric heater 84 responsive to a temperature rise to a desired maximum.

A cold water tap 87 is provided adjacent the bottom of tank 17 for delivering water (manually operable) from tank 17, as desired or needed. A manually operable hot water tap 88 is connected by a tube 89 to hot water product tank 18 for withdrawing product hot water as needed or desired.

The device illustrated in the Figures has been described with respect to its general layout. It is to be understood that the system is provided with various hoses and tubing and valves, best shown in FIGURE 4, linking the various elements together in a manner which will be evident from the following description of the operation of the system.

For purposes of giving an illustrative example of the operation, polyphosphate container 35 was filled with glassy polyphosphate having a solubility of about ten parts per million in the cold impure water which was to be purified. Container 36 was filled with highly absorptive charcoal. Water supply inlet tube 92 was connected to a suitable supply of brackish water. It will be noted that tube 92 includes a solenoid operated inlet valve 93 which is normally closed but can be electrically activated to open, and which is controlled by a switch in temperature sensor 72. Temperature sensor switch 72 has been set to open valve 93 at a temperature in the range of about 110–115° F. and to close valve 93 at a temperature in the range of about 104–108° F. to maintain proper temperature throughout the system. As an advantageous result the body of water 50 is maintained at a temperature low enough to prevent destruction of the polyphosphate which is usually rendered ineffective at temperatures of about 190° to 195° F. or higher. Switch 27 is turned to the "on" position and switch 28 is closed by the water level and temperature sensor 78, thereby starting motor 25 and compressor 31. Upon opening of valve 93 by temperature sensor 72, impure water flows through line 92 and container 35 to tank 16 to provide the body of water 50 therein, overflow leaving through overflow system 52 and tube 97, through trap 37 and adaptor 38, and to common drain line 98.

Compressor 31 draws fluid through line 32, compresses the fluid and pumps it through line 33 at a temperature of about 195° F. and through heating coil 46 to evaporate water sprayed on coil 46. The refrigerant fluid passes from coil 46 through a line 101, which is submerged in the body of water 50, to a capillary tube or restriction 102 where the fluid is permitted to expand into cooling tube 47, entering cooling tube 47 at a temperature of about 45° F. for cooling and condensing water vapors. Condensed pure water is withdrawn from collection trough 45 through outlet 74 and tube 95 which conducts the purified water through charcoal container 36, for removal of any entrained impurities, before delivering the water to cold water product storage tank 17.

Cooling fluid from tube 47 is directed by insulated line 103 through heat exchanger 81 in tank 17 for cooling the product water and thence through insulated suction line 32 for return to compressor 31. The temperature sensor element of sensor 78 is set to turn switch 28 to "on" position when the temperature in tank 17 rises to about 70° F. and to turn off the switch 28 when the temperature falls to about 50° F. Sensor 78 thereby controls the entire system, turning switch 28 on to provide both product cooling and a full product water tank. Where tank 17 is full when sensor 78 turns on the entire system for cooling, the overflow standpipe 77 is adequate to remove overflow water to trap 37 and common drain line 98.

Although not shown in the diagram of FIGURE 4, line 95 enters tank 17 through a Tee fitting 104 at the bottom of tank 17 which also connects with a line 96 for conducting water into hot water product storage tank 18. By way of line 96 which interconnects tanks 17 and 18, the head of the cold water in tank 17 is applied to the water in tank 18 so that when tap 88 is open, sufficient head is present for flow of hot water. Also, water is supplied by gravity flow from line 95 and tank 17 through line 96 to maintain hot water tank 18 full so long as water is present in tank 17. Thus, it is unnecessary to sense the level of water in the hot water tank for starting and stopping the system, since sensor 78, in effect, assures that tank 18 will be full, and that tank 17 will be maintained at a level above the minimum water level setting.

It has been found, in operation of the form of system shown in the drawings, that a small tank used as the polyphosphate container 35 is capable of containing a sufficient supply of glassy polyphosphate, having a solubility of about ten p.p.m. in the feed water, to last for from six to twelve months during normal use of the water purification system. Thus, the use of the glassy polyphosphate is particularly preferred in the present system, although a more intricate dispensing arrangement could alternatively be used for dispensing a solution of polyphosphate into feed line 92. Other modifications can also be made in the described system, as desired.

I claim:

1. An apparatus for purifying water which comprises an upright frame, means mounted on said frame having walls defining a purification chamber including separate evaporating and condensing zones with a cyclic flow path therebetween, heat pump means mounted on said frame and including heating means in the evaporating zone and cooling means in the condensing zone for pumping heat from the cooling zone to the evaporating zone, feed conduit means for directing impure water into said evaporating zone to form a body of water therein, feed valve means for opening and closing said feed conduit, temperature sensor means for operating said feed valve means to control flow through said feed conduit responsive to temperature of said body of impure water, means containing a body of solid polyphosphate in said feed conduit in direct contact with feed water flowing through said feed conduit for providing at least .5 p.p.m. polyphosphate in impure water directed through said feed conduit for reducing scale forming tendency of the feed water in the purification chamber, overflow means in said purification chamber regulating the level of said body of impure water, pump means mounted for rotation in contact with said body of water for drawing water from said body of impure water and delivering the drawn water into contact with said heating means in said evaporating zone, impeller means for producing flow of a stream of air through said cyclic flow path, whereby water vapor resulting from contact of impure water with said heating means is carried to said cooling means and is condensed on said cooling means as pure water, motor means for driving said impeller means and pump means, product collection means in said condensing zone for collecting pure water from said cooling means, a cold water storage tank mounted on said frame below said purification chamber and cooled by the cooling means of said heat pump, a hot water storage tank including heater means and mounted on said frame below said cold water storage tank, open conduit means connecting said cold water storage tank with said hot water storage tank, means for directing product water from said collection means to said connecting conduit means whereby when water is needed by both said tanks the water is supplied from the collection means first to supply the need of the hot water tank and thereafter to supply the need of the cold water tank, and water level and temperature sensor means in said cold water tank for controlling said motor and heat pump to start at a predetermined minimum water level and at a predetermined minimum water temperature in said cold water tank.

2. In an apparatus for purifying water including a ferrous metal evaporator tank defining a purification chamber having separate evaporating and condensing zones with a cyclic flow path therebetween, feed conduit means for supplying a body of impure water to the purification chamber, overflow means in said purification chamber regulating the level of said body of impure water, heating means in the evaporating zone for heating the body of water and for vaporizing water sprayed thereon and cooling means in the condensing zone, means for producing flow of air through said cyclic flow path from the heating means in the evaporating zone to said cooling means in said condensing zone and return, whereby vaporized water is continuously carried from said heating means to said cooling means and is condensed thereon, and product collection means in said condensing zone for collecting condensed water from said cooling means, the improvement which comprises, in combination therewith, means containing a body of solid polyphosphate in said feed conduit in direct contact with feed water flowing through said feed conduit for providing at least .5 p.p.m. polyphosphate in impure water directed through said feed conduit for reducing scale forming tendency of the impure water in the purification chamber, rotatively operable pump means mounted for contacting the body of impure water and having a plurality of separate surfaces defining separate routes for delivering water from said body of impure water into contact with said heating means, means for retaining the body of impure water against substantial swirling responsive to rotation of the pump means, temperature sensor means and inlet valve means for controlling flow through said feed conduit responsive to temperature of said body of water, a cold water storage tank, a hot water storage tank mounted below said cold water storage tank, open conduit means connecting said cold water storage tank with said hot water storage tank, means for directing product water from said collection means to said connecting conduit means, and water level sensor means in said cold water tank for starting said impeller and pump means responsive to a predetermined minimum water level and stopping said impeller and pump means responsive to a predetermined maximum water level in said cold water tank.

3. The apparatus of claim 1 wherein said pump means comprises a plurality of separate pumping surfaces defining separate routes for delivering water from said body of impure water as the pump rotates as a spray into contact with said heating means and including means retaining said body of water against swirling from roation of the pump means.

4. In an apparatus for purifying water including a purification chamber having heated water vaporizing means and means for maintaining a body of water beneath the heated means, feed conduit means for supplying a body of impure water to the purification chamber, cooling means in a condensing zone, means for directing vapor from the heated means in the evaporating zone to said cooling means in said condensing zone, whereby vaporized water is continuously moved from said heated means to said cooling means and is condensed thereon, and product collection means for collecting condensed water from said cooling means, the improvement which comprises pump means for delivering water from said body of impure water as a spray into contact with said heated means comprising a generally conical hollow member mounted for rotation on a generally vertical axis and having open inlet means at the smaller end beneath the surface of said body and outlet means at the larger end of the conical member adjacent said heated means, and means for rotating the member on said axis with the inlet end in contact with the body of water, said conical member having wall means defining a first flow path for impure water from said body up the outer surface thereof for delivery to the heated means and a second flow path for impure water from said body through the inlet means and up the inner surface of the wall for delivery from said outlet means to said heated means.

5. The apparatus of claim 4 including generally circular ridge means on the outer surface of said member between the inlet and outlet ends thereof for directing impure water to said heated means.

6. The apparatus of claim 5 including additional port means through the conical member wall intermediate said ridge and output port for delivering water from the inner surface of said conical member at a level intermediate that of said ridge means and output port.

7. The apparatus of claim 4 wherein said generally conical hollow member is defined by a wall having generally parallel inner and outer surfaces and including first and second integral conical sections each having its minimum diameter at one end and its maximum diameter at the other end with the minimum diameter of said first section defining an intake port, the maximum diameter of said second section defining the pump output port and the minimum diameter end of said second section being integrally joined to the maximum diameter end of said first section thereby defining a sharp ridge transition between said first and second conical sections, and including motor means having a driven shaft, means mounting said hollow conical member on said shaft for rotation coaxial therewith with said intake port immersed in said body of impure water, said motor means being sufficient to drive the conical member at a sufficient rotational rate for drawing water up the inner and outer surfaces of said hollow conical member whereby water is delivered through said output port at the top of said conical member from the interior surface of said conical member and water is delivered intermediate said intake and output ports at said ridge from the exterior surface of said conical member.

8. The apparatus of claim 4 including tank means containing the body of impure water and means retarding the body of water from swirling from the pump means comprising a plurality of spaced elongated dams upstanding from the bottom of said tank with their lengths disposed generally along radii of the axis of pump rotation.

9. In an apparatus for purfying water including walls defining a purification chamber having separate evaporating and condensing zones with a flow path therebetween, feed conduit means for supplying a body of impure water to the purification chamber, overflow means in said purification chamber regulating the level of said body of impure water, heating means in the evaporating zone having a heating surface for heating the body of water and for vaporizing water sprayed thereon, and cooling means in the condensing zone, means for producing flow of air through said flow path from the heating means in the evaporating zone to said cooling means in said condensing zone and return, whereby vaporized water is continuously carried from said heating means to said cooling means and is condensed thereon, and product collection means for collecting condensed water from said cooling means, the improvement which comprises, in combination therewith, means for providing at least .5 p.p.m. polyphosphate in impure water directed through said feed conduit for reducing scale forming tendency of the impure water in the purification chamber, means for regulating flow through said feed conduit to said purification chamber, and temperature sensor means responsive to temperature of said body of impure water for controlling said regulating means to increase the flow of water to the purification chamber responsive to an increase in temperature of said body of impure water to a predetermined temperature below the destruction temperature of the polyphosphate and below the boiling point of the impure water.

10. The apparatus of claim 9 including a zinc anode in said chamber and extending into the body of impure water for preventing corrosion of the metal surface of said heating means by galvanic action.

11. In an apparatus for purifying water including a purification chamber having separate evaporating and condensing zones with a cyclic flow path therebetween, feed conduit means for supplying a body of impure water to the purification chamber, overflow means in said purification chamber regulating the level of said body of impure water, heating means in the evaporating zone for heating the body of water and having evaporating surface means for vaporizing water and cooling means in the condensing zone, means for producing flow of air through said cyclic flow path from the evaporating surface means in the evaporating zone to said cooling means in said condensing zone and return the evaporating surface means, whereby vaporized water is continuously carried by the air stream from said heating means to said cooling means and is condensed thereon and the air stream is returned to pick up more vapor, and product collection means in said condensing zone for collecting condensed water from said cooling means, the improvement which comprises in combination therewith means containing a body of solid [glassy] polyphosphate in said feed conduit in direct contact with feed water flowing through said feed conduit for providing at least 5 p.p.m. polyphosphate in impure water directed to said feed conduit for reducing scale forming tendency of the feed water in the purification chamber.

12. An apparatus for producing purified water which comprises an upright frame, an evaporator tank mounted on said frame adjacent the top of said frame, partition means in said evaporator tank defining a separate lower evaporating zone and upper condensing zone with a cyclic flow path therebetween, said partition means comprising a traverse wall having a central opening and a downward extending peripheral skirt with a circular depression in the wall, defining a circular product water collection trough, heat pump means including a compressor mounted on said frame adjacent the bottom of the frame and including a heating coil vertically disposed in the evaporating zone adjacent said peripheral skirt and a circular radiant fin cooling tube in the condensing zone above said trough whereby the trough receives condensate from said cooling tube, cover means on said evaporator tank, a motor mounted above said cover means and having a shaft extending through said cover means and centrally through said central opening, inlet means for introducing impure water into the bottom portion of said evaporator tank, overflow means in said evaporator tank regulating the level of water in said tank to a predetermined level to define a body of impure water, pump means operable upon rotation thereof for drawing water from the body of impure water and delivering the drawn water into contact with said heating means in said evaporating zone, impeller means for producing flow of a stream of air through said cyclic flow path, means mounting said impeller means and pump means on said shaft for rotation therewith with the impeller disposed in said central opening for driving air downward and the pump means disposed therebelow substantially coaxially within said coil and extending at the pump intake end below the water level in the evaporator tank, whereby upon operation of said motor water vapor resulting from contact of impure water with said heating means is carried by a cyclic stream of air against the body of impure water and thence radially beneath said skirt and upwardly to said cooling means for condensing water and thereafter through said central opening for return to said heating means and said trough means in said condensing zone collects pure water form said cooling means, a cold water storage tank mounted on said frame below said evaporator tank, a cooling coil extension of said cooling means in said cold water storage tank for cooling water therein, a hot water storage tank including heater means and mounted on said frame below said cold water storage tank and above said compressor, conduit means connecting said cold water storage tank with said hot water storage tank, means for directing product pure water from said collection trough to said cold water tank, and pure water level sensor means responsive only to water level in said cold water tank for controlling said motor and compressor to start at a predetermined minimum water level.

13. An apparatus for purifying water which comprises an evaporator tank, partition means in said evaporator tank defining a separate lower evaporating zone and upper condensing zone with a cyclic flow path therebetween, said partition means comprising a transverse wall having a central opening, a downward extending peripheral skirt with a circular depression in the wall defining a circular product water collection trough between said central opening and skirt, heat pump means including a compressor and including a heating coil vertically disposed in the evaporating zone adjacent said peripheral skirt and a circular radiant fin cooling tube in the condensing zone above said trough whereby the trough receives condensate from said cooling tube, cover means on said evaporator tank, a motor mounted above said cover means and having a shaft extending through said cover means and centrally through said central opening, inlet means for introducing impure water into the bottom portion of said evaporator tank, overflow means in said evaporator tank regulating the level of water in said tank to a predetermined level to define a body of impure water, pump means operable upon rotation thereof for drawing water from the body of impure water through the pump intake and delivering the drawn water from the pump output and into contact with said heating means in said evaporating zone, impeller means for producing flow of a stream of air through said cycle flow path, means mounting said impeller means and pump means on said shaft for rotation therewith with the impeller disposed in said central opening for driving air downward and the pump means disposed therebelow substantially coaxially within said coil and extending at the pump intake end below the water level in the evaporator tank, whereby upon operation of said motor water vapor resulting from contact of impure water with said heating means is carried by a cyclic stream of air against the body of impure water and thence radially beneath said skirt and upwardly to said cooling means for condensing water and thereafter through said central opening for return to said heating means and said trough means in said condensing zone collects pure water from said cooling means.

References Cited

UNITED STATES PATENTS

| | | | |
|---|---|---|---|
| 2,803,590 | 8/1957 | Skow | 202—232 |
| 2,885,328 | 5/1959 | Williamson | 202—167 |
| 2,960,449 | 11/1960 | Williamson | 202—163 |
| 2,979,442 | 4/1961 | Badger | 203—7 |
| 3,105,021 | 9/1963 | Randall | 202—160 X |
| 3,200,050 | 8/1965 | Hogan et al. | 203—11 X |
| 3,214,933 | 11/1965 | Morton | 62—188 |
| 3,236,746 | 2/1966 | Poindexter et al. | 202—187 X |
| 3,245,883 | 4/1966 | Loebel | 203—7 |
| 1,859,770 | 5/1932 | Fleisher | 202—236 X |
| 3,256,159 | 6/1966 | Salzer | 202—178 |

NORMAN YUDKOFF, *Primary Examiner.*

F. E. DRUMMOND, *Assistant Examiner.*

U.S. Cl. X.R.

202—236; 203—10, 26